United States Patent [19]

Scott et al.

[11] Patent Number: 4,672,088

[45] Date of Patent: Jun. 9, 1987

[54] STABILIZED THERMOPLASTIC POLYMER COMPOSITIONS COMPRISING A C-NITROSO COMPOUND

[76] Inventors: Gerald Scott; Khirud B. Chakraborty, both of Department of Chemistry, The University of Aston in Birmingham, Gosta Green, Birmingham B4 7ET, United Kingdom

[21] Appl. No.: 740,064

[22] PCT Filed: Oct. 1, 1984

[86] PCT No.: PCT/GB84/00335

§ 371 Date: May 24, 1985

§ 102(e) Date: May 24, 1985

[87] PCT Pub. No.: WO85/01508

PCT Pub. Date: Apr. 11, 1985

[51] Int. Cl.[4] ............................................. C08K 5/32
[52] U.S. Cl. .................................... 524/236; 524/237; 524/567; 524/570; 524/583; 524/585
[58] Field of Search ............... 524/236, 237, 567, 570, 524/583, 585

[56] References Cited

U.S. PATENT DOCUMENTS

| | | | |
|---|---|---|---|
| 2,619,479 | 11/1952 | McQueen | 524/236 |
| 3,384,613 | 5/1968 | Parks | 524/236 |
| 3,826,779 | 7/1974 | Ashworth et al. | 524/236 |
| 3,868,252 | 2/1975 | Campbell et al. | 430/215 |
| 3,872,057 | 3/1975 | Pazos | 525/332.9 |
| 3,879,337 | 4/1975 | Manino et al. | 524/576 |
| 3,886,106 | 5/1975 | Lohr et al. | 524/236 |
| 3,994,857 | 11/1976 | Holt . | |
| 4,088,488 | 5/1978 | Chang et al. | 430/233 |
| 4,123,273 | 10/1978 | Ciurca et al. | 430/336 |
| 4,124,387 | 11/1978 | Kohrt | 430/203 |
| 4,168,982 | 9/1979 | Pazos | 204/159.23 |
| 4,204,928 | 5/1980 | Via | 204/159.23 |
| 4,308,365 | 12/1981 | Czerwinski | 524/236 |

FOREIGN PATENT DOCUMENTS

| | | | |
|---|---|---|---|
| 2127869 | 9/1972 | France . | |
| 1185896 | 3/1970 | United Kingdom . | |
| 1379232 | 1/1975 | United Kingdom | 524/236 |
| 0896025 | 1/1982 | U.S.S.R. | 524/236 |

OTHER PUBLICATIONS

"Chem & Technology of Rubber Bound & Related Novel Antioxidants" Cain et al., pp. 204–221 *Rubber Chem & Tech., Jun. 1972.*
Chem. Abs. 90-55571 Anisimova et al. 1978.
Chem. Abs. 74-76913 Karpukhin et al. 1971.
Jour. Applied Poly Sci, vol. 30, pp. 3267–3281 (1985) Chakraborty et al. Class 524, Subclass 236.
Chem Abs. 80-28198w, Banks et al., Aug. 1973.
Chem. Abs 93-240204h, Niki et al., 1980.

*Primary Examiner*—Herbert J. Lilling
*Attorney, Agent, or Firm*—Oblon, Fisher, Spivak, McClelland & Maier

[57] ABSTRACT

Thermoplastic polymers are stabilized by mixing therewith, under polymer processing conditions such that nitroxyl radicals are formed, a nitrogen stabilizers therefor, which is (a) a C-nitroso-containing compound (b) an N-nitroso-containing compound, or (c) a nitrone-containing compound.

9 Claims, No Drawings

STABILIZED THERMOPLASTIC POLYMER COMPOSITIONS COMPRISING A C-NITROSO COMPOUND

This invention relates to the stabilization of thermoplastic polymer compositions.

Most thermoplastic polymers are subject to oxidative deterioration during processing or in service. This deterioration can lead to loss of properties by the polymers, e.g. embrittlement or discolouration, which can be undesirable. Most particularly thermoplastic polymers are subject to deterioration when, in service, they are in an outdoor environment or otherwise subjected to U.V. radiation. In addition deterioration can occur, e.g. as a result of oxidation, when, in service, the polymers are subjected to high temperature. Also the high shearing forces and temperatures used in polymer processing often result in deterioration.

It is well known to incorporate so-called stabilizers into thermoplastic polymer compositions to prevent or retard such deterioration processes. Such stabilizers, according to the manner in which they act, are U.V. stabilizers, thermal antioxidants or melt stabilizers. Amongst the commercially available U.V. stabilizers are the compounds of the formulae

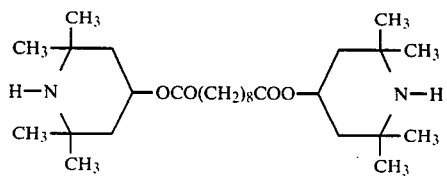

[bis(2,2,6,6-tetramethyl-4-piperidinyl)sebacate] and

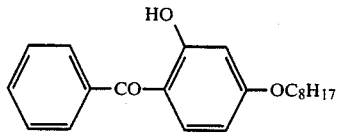

which are sold under the names Tinuvin 770 (ex Ciba-Geigy AG) and Cyasorb UV 531 (ex American Cyanamid) respectively. Such conventional stabilizers, in particular Tinuvin 770, are often expensive to prepare. In order to ensure that a particular polymer composition has the required stability characteristics, it is often necessary to use a mixture of stabilizers. For example there may be added to the polymer both a U.V. stabilizer and a melt stabilizer to protect the polymer from deterioration both during the processing of it and during its service. This of course tends further to add to cost.

The mechanism of the stabilization is not fully understood and clearly different stabilizers can act in different ways. For example the mechanism by which Tinuvin 770 stabilizes thermoplastic polymers is different from that by which Cyasorb UV 531 stabilizes them. Recent studies (Bagheri, Chakraborty & Scott, Polymer Degradation and Stability 4, (1982), 1–16) on the use of hindered piperidines, of which Tinuvin 770 is an example, attribute stabilizing effectiveness to the oxidation of the hindered piperidines to nitroxyl radicals during the polymer processing and subsequently when the thermoplastic polymer mixture is exposed to U.V. radiation. It is the presence of these nitroxyl radicals which is believed to give rise to the stabilization.

It has now been found that thermoplastic polymers, in particular polyolefins, e.g. polyethylene and polypropylene, and polyvinyl chloride, may be stabilized against oxidative deterioration by mixing therewith a C-nitroso-containing compound, an N-nitroso-containing compound or a nitrone compound under polymer processing conditions such that there are formed nitroxyl radicals.

According to the present invention, there is provided a process for preparing a stabilized thermoplastic polymer composition which process comprises mixing the thermoplastic polymer with a nitrogen-containing stabilizer, which is
(a) a C-nitroso-containing compound,
(b) an N-nitroso-containing compound, or
(c) a nitrone-containing compound,
under polymer processing conditions such that nitroxyl radicals are formed.

It is important that the compositions prepared according to the present invention are formed under polymer processing conditions such that nitroxyl radicals are formed. The required conditions are conditions in which the polymer is subjected to high shear in which polymer chains become severed resulting in the mechanochemical formation of hydrocarbyl radicals. Mere mixing without shear, e.g. of polymer and stabilizer solutions, will not provide the U.V. stabilization properties of the present invention. While we do not wish in any way to be bound by the theory, it is believed that the macrohydrocarbyl radicals and related mechanochemical radicals formed from the polymer in the processing step react with the stabilizer compounds according to the present invention to form the nitroxyl radicals. In particular it has been observed that stabilization obtained with the compounds according to the present invention is dependant upon the concentration of nitroxyl radicals in the composition after processing. In the case of the C-nitroso compounds and the nitrone compounds, these are believed to react directly with the hydrocarbyl compounds in a radical trapping reaction to form the nitroxyl radicals. In the case of the N-nitroso compounds, it is believed these dissociate and react further to give two different kinds of nitroxyl radical.

The polymer processing conditions necessary for nitroxyl radical formation according to the present invention depend, in particular, on the thermoplastic polymer used. Generally speaking the polymer and stabilizer are mixed together under high shear at above 150° C., usually 160° to 350° C., and preferably 180° to 280° C. in a mixer conventionally used for polymer processing. During the mixing shear is at its highest initially and decreases as the polymer is broken up. It is thus initially that the polymer chains are severed with hydrocarbyl radical formation. It is important according to the present invention that the stabilizer should be present during this high shear to obtain the good results according to the invention. Processing time also depends on the ingredients being used but will generally be 10 to 20 minutes.

It has been found that the C-nitroso compounds (i.e. compounds containing at least one C—N=O group) have good U.V. stabilizing activity for, i.e. they prevent or retard the photo-oxidative embrittlement of, thermoplastic polymers. Also the C-nitroso compounds have melt stabilizing activity. The C-nitroso compounds may in particular be aliphatic or aromatic compounds with nitroso-alkanes being preferred. Generally speaking aromatic nitroso compounds are less effective as U.V. light stabilizers but are more effective than their alkyl analogues as thermal antioxidants.

C-nitroso compounds according to the present invention include those of the general formula I:

$$R-N=O \quad (1)$$

wherein R represents an unsubstituted or substituted alkyl group, preferably a tertiary alkyl group (e.g. tertiary butyl or octyl, or a group $C(CH_2OR')_3$ or a group $R_xC(CH_2OR')_{3-x}$ wherein x is 1,2 or 3, R is as defined below and R' represents a hydrogen atom or an unsubstituted or substituted alkyl or acyl group and in which each R' may be the same or different), and R may be an unsubstituted or substituted (e.g. alkyl-, chloro-, hydroxy-, carboxyl-, cyano-, nitro-, or dimethylamino-substituted) phenyl or naphthyl group (e.g. phenyl, tetramethyl-phenyl, pentamethyl-phenyl, trichloro-phenyl, hydroxy-phenyl, di-tert-butyl-hydroxy-phenyl, dimethylamino-phenyl and hydroxy-naphthyl) or a heterocyclic aromatic or reduced heterocyclic (e.g. piperidinyl) group.

Particularly preferred C-nitroso compounds are the tertiary alkyl nitrosos, particularly 2-nitroso-2-methyl-propane and 2-nitroso-2,4,4-trimethylpentane. These compounds are highly effective as U.V. stabilizers and act as melt stabilizers. At the same time the compounds are much cheaper to produce than conventional commercially available stabilizers.

It has also been found that N-nitroso compounds (b) act as U.V. stabilizers to prevent or retard the photo-oxidative embrittlement of thermoplastic polymers. These compounds are also generally effective as melt stabilizers. The N-atom of the N-nitroso group can be attached to aliphatic, cycloaliphatic, aromatic and araliphatic groups. However preferably the nitrogen atom is attached to two alkyl groups to give a branched structure described generally as:

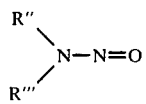

wherein R" and R''' are branched chain hydrocarbon radicals, preferably tertiary. Most preferably the nitrogen atom forms part of a saturated 6-membered ring, which may contain other N-hetero-atoms. Particularly preferred such compounds are

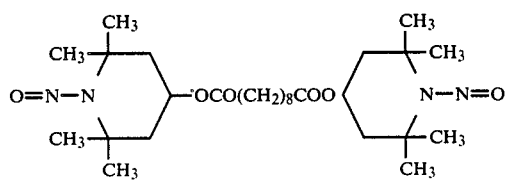

and

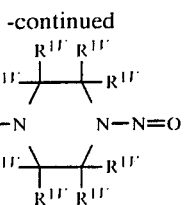

wherein each R" group represents hydrogen or alkyl.

The first of these compounds is a novel compound and corresponds to the bis nitrosamine derived from the commercially available Tinuvin 770 product. It has almost twice the effectiveness as a U.V. stabilizer of Tinuvin 770 and also is an effective melt stabilizer and thus it is a preferred compound according to the invention. Thus, unlike Tinuvin 770 itself, which is not an effective melt stabilizer, it does not require a separate melt stabilizer to be added to the system.

It has further been found that nitrone compounds (c), in particular aldonitrones, preferably N-phenyl and N-tert.alkyl aldonitrones, when used in thermoplastic polymers are stabilizers. These compounds have good melt stabilizing activity and have thermal oxidative stabilizing effect. Nitrone compounds are generally weak U.V. stabilizers when used alone.

Preferred nitrones are those of the general formula II

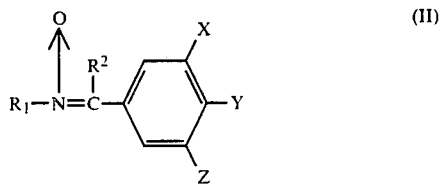

wherein $R_1$ represents an alkyl or substituted alkyl, preferably tertiary alkyl (e.g. tert. butyl), group or an aromatic or substituted aromatic, preferably phenyl, group, $R_2$ represents a hydrogen atom or an alkyl or aryl group, and X and Z may each represent a hydrogen atom or a lower alkyl, e.g. methyl, group and Y represents a hydrogen atom or a hydroxy or alkoxy, e.g. methoxy, group. Most preferably there is used a benzaldonitrone containing a partially hindered 4-hydroxy group on the phenyl ring.

In choosing the stabilizer to use according to the present invention, regard has to be taken of the physical properties of the stabilizer. Thus for example in many applications the use of a stabilizer which is highly coloured needs to be avoided. Also for example stabilizers which are lost to the system e.g. by being volatile under the processing conditions should be avoided.

The stabilizers according to the present invention are in general known compounds and may be obtained by methods known per se. For example they may be obtained as follows:

Nitroso alkanes may be prepared by oxidation of the corresponding amines with hydrogen peroxide by the methods of Stowell (J. Org. Chem., 36, 3055 (1971)).

Aromatic nitroso compounds may be prepared by oxidation of the corresponding amine with hydrogen peroxide by the method of Richard and Bayer (J. Am. Chem. Soc., 82, 3455 (1960)).

Nitrones may be prepared by reacting a hydroxylamine with the corresponding aldehyde by the reaction of Beckman (Chem. Ber., 27, 1894 (1958)).

Nitrosamines may be prepared by the method of Vogel (Prac. Org. Chem., Longman (1967)).

As mentioned above however the bis nitrosamine derived from the commercially available Tinuvin 770 [bis(2,2,6,6-tetramethyl-4-piperidinyl)sebacate] is a novel compound. This compound can be obtained from the sebacate by reaction with sodium nitrite in the presence of acid.

The thermoplastic polymers of the stabilized compositions according to the present invention are generally saturated thermoplastic polymers, in particular polyolefins, e.g. polyethylene and polypropylene, and polyvinyl chloride. However there may generally be used other organic thermoplastic polymers with carbon-carbon bonds including polyesters, polyamides and rubber modified plastics such as ABS and rubbers which are used as thermoplastics without vulcanisation or cross-linking such as ethylene/propylene copolymers and styrene butadiene block copolymers.

One interesting aspect of the present invention is the use of stabilizers according to the invention in conjunction with other stabilizers. As noted above the C-nitroso and the N-nitroso compounds act in particular as U.V. stabilizers and in addition have melt stabilizing activity. The nitrones have in particular good melt stabilizing effect and have thermal antioxidant activity. By using other stabilizers in conjunction with the stabilizers according to the invention, stabilizing effect may be broadened and increased. Particularly interesting is the use of stabilizers according to the invention in conjunction with other stabilizers and synergism then observed. For example there may be included in the compositions according to the invention U.V. stabilizer compounds to give high U.V. stability. Such U.V. stabilizers compounds include Tinuvin 770, Cyasorb UV 531 and Tinuvin 327. [Tinuvin 327, ex Ciba-Geigy AG, is a benztriazole of the formula:

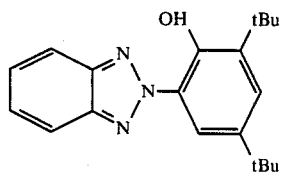

tBu represents tertiary butyl.] Such U.V. stabilizers can be used in conjunction with C-nitroso-containing stabilizers to give compounds of high U.V. stability. Alternatively, it may be desirable if for example thermal antioxidative stability is required to use a thermal antioxidant together with a C-nitroso-containing stabilizer. Similarly if the stabilizer used according to the present invention is a nitrone, and U.V. stability is required it may be used in conjunction with a known U.V. stabilizer. It has been found that when stabilizers according to the invention are used in conjunction with for example U.V. stabilizers there is a synergistic effect i.e. the U.V. stability of the final composition is higher than might be expected on the basis of the summed activities of the individual stabilizers when used alone. Also a synergistic effect may be observed when a thermal antioxidant is used with a C-nitrosamine.

The processing conditions under which the compositions according to the present invention are prepared are important to the obtaining of stabilization according to the present invention. As explained above, it is believed that radicals formed mechanochemically under the high shear conditions of processing react with the stabilizers according to the present invention to result in the formation of a nitroxyl radical. If mixing is carried out under conditions which do not result in nitroxyl formation the stabilization according to the invention is not obtained. Indeed observations indicate that the amount of stabilization obtained depends on the level of nitroxyl radical formation. Generally the composition according to the present invention will be prepared by simply mixing the thermoplastic polymer and stabilizer ingredients using a conventional extruder or injection moulding machine. The importance of the processing operation has been demonstrated in that the effectiveness of the present stabilizers in stabilization is dependent upon processing time. Thus generally there is an optimum processing time to give optimal stabilization and if this time is not reached or is exceeded, reduced stabilization will be obtained.

In the commercial formulation of polymer compositions, processing times are often fixed by the residence time of the machinery being used. In these circumstances it may be advantageous to produce a master-batch composition according to the present invention having a high content of stabilizer. This master-batch may be obtained under processing conditions which ensure that optimum stabilization is obtained and then may be used as additive to a thermoplastic polymer in a conventional extruder or injection moulding machine. In this way the optimum stabilization of the present invention may be obtained without the residence time in the conventional extruder or conventional moulding machine being critical. The processing time used in the production of the master-batch on the other hand can be readily adjusted and is chosen such as to provide optimum stabilization. The master-batch may suitably be advantageous to introduce additional radical generators, for example, dialkyl peroxides, during the processing operation.

The stabilizers according to the present invention are generally used at up to 1% by weight of the thermoplastic polymer composition. The preferred range is usually 0.05 g to 0.5 g stabilizer per 100 g of polymer. In the case of master-batches however the concentration of stabilizer will be considerably greater. For example between 2 and 15% by weight of the thermoplastic polymer composition.

The following Examples illustrate the invention.

EXAMPLE 1

Tests were carried out using the following compounds:

| Structural formulae | Code | Mp (°C.) |
|---|---|---|
| $(CH_3)_3C-N=O$ | tB-NO | 80–81 |
| $(CH_3)_3CCH_2\underset{\underset{CH_3}{\|}}{\overset{\overset{CH_3}{\|}}{C}}-N=O$ | tO-NO | 63–65 |
| ⌬—N=O | B-NO | — |

| Structural formulae | Code | Mp (°C.) |
|---|---|---|
| (2,3,5,6-tetramethyl nitrosobenzene) CH₃,CH₃,CH₃,CH₃ ring with N=O | TMB-NO | 158 |
| (pentamethyl nitrosobenzene) | PMB-NO | 157 |
| (2,4,6-trichloro nitrosobenzene) | TCB-NO | 142-3 |
| (p-hydroxy nitrosobenzene) | HB-NO | — |
| (2,5-di-tert-butyl-4-hydroxy nitrosobenzene) | HBB-NO | 216 |
| (p-dimethylamino nitrosobenzene) | DMA-NO | — |
| (1-hydroxy-2-nitroso naphthalene) | HN-NO | 103 |

(tBu represents tertiary butyl.)

U.V. Stabilization

The C-nitroso compounds above were compounded under polymer processing conditions in a RAPRA Torque Rheometer with polypropylene at 180° C. and at the rate of $10^{-3}$ moles/100 g except where indicated otherwise using the processing times indicated below.

In each case, the composition was formed by compression moulding into a film which was then exposed to a sun lamp black lamp (SB) which simulates sunlight. The time before the film became brittle was measured. The results obtained were as follows:

| Nitroso compound | Embrittlement time (hrs) Processing time (mins) | | | |
|---|---|---|---|---|
| | 7.5 | 10 | 15 | 20 |
| Control (no additive) | 85 | 85 | 75 | — |
| tB—NO* | 660 | 770 | 875 | 800 |
| tO—NO | 660 | 690 | 650 | 630 |
| B—NO | 330 | 330 | 280 | 240 |

| Nitroso compound | Embrittlement time (hrs) Processing time (mins) | | | |
|---|---|---|---|---|
| | 7.5 | 10 | 15 | 20 |
| PMB—NO | — | 200 | — | — |
| TCB—NO | 180 | 200 | 180 | 160 |
| HB—NO | — | 170 | — | — |
| HBB—NO | — | 160 | 185 | 200 |
| DMA—NO | 230 | 260 | 210 | 190 |
| HN—NO | — | 150 | — | — |

*1.5 · $10^{-3}$ moles/100 g.

Melt Stabilization

The melt stabilization of polypropylene obtained with C-nitroso compounds according to the invention was measured and compared with that of polypropylene without melt stabilizer.

Unlike polypropylene without melt stabilizer, in which the melt flow index doubled within 5 minutes on processing in a RAPRA Torque Rheometer at 180° C., the C-nitroso compounds showed an induction period before any change occurred. The times taken (mins) to the end of the induction period at 180° C. in a RAPRA Torque Rheometer are as follows:

| Nitroso compound | Induction period (mins) |
|---|---|
| tB—NO | 20 |
| tO—NO | 15 |
| B—NO | 25 |
| PMB—NO | 20 |
| TCB—NO | 10 |
| HB—NO | 30 |
| HBB—NO | 25 |
| DMA-NO | 30 |
| HN—NO | 10 |

Thermal Antioxidant Activity

The C-nitroso compounds were compounded at the rate of $10^{-3}$ moles/100 g polypropylene and processed at 180° C. A film was formed and the time to embrittlement (single cell air oven at 140° C.) was measured.

The results obtained were as follows:

| Nitroso compound | Colour | Embrittlement time, (hrs) Processing time (mins) | | | |
|---|---|---|---|---|---|
| | | 7.5 | 10 | 15 | 20 |
| Aliphatic | | | | | |
| tB—NO | Colourless | 1.0 | 1.0 | 0.5 | 0.5 |
| tO—NO | Colourless | 1.0 | 1.0 | 0.7 | 0.7 |
| Aromatic | | | | | |
| B—NO | Colourless | — | 7.0 | — | — |
| TMB—NO | Yellow | 9.0 | 12.0 | 11.0 | 6.5 |
| PMB—NO | Yellow | 9.5 | 11.5 | 20.5 | 19.0 |
| TCB—NO | Yellow | 3.5 | 4.5 | 3.5 | 3.0 |
| HB—NO | Brown | — | 5.0 | — | — |
| HBB—NO | Yellow | 14.0 | 21.0 | 18.5 | 16.0 |
| DMA-NO | Brown | — | 11.0 | — | — |
| HN—NO | Brown | — | 8.5 | — | — |

Synergism with Phenolic Antioxidants

It can be seen from the above table that the nitroso alkanes have little thermal antioxidant activity. However, it was found that in combination with a commercial hindered phenol, synergism was observed and a very thermally stable formulation was obtained. Thus Irganox 1076+tB-NO each at $5 \times 10^{-4}$ moles/100 g give an embrittlement time at 140° C. of >41 hours. [Irganox 1076, ex Ciba-Geigy, is of the formula:

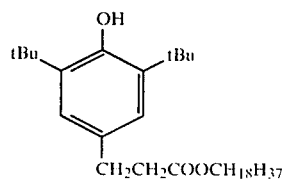

tBu representing tertiary butyl.]

Nitroxyl Concentration

The concentration of nitroxyl radicals ($10^{-5}$ mole/100 g) in polypropylene after processing with the nitroso compounds in a closed mixer (180° C.) was measured. The initial concentration of C-nitroso compound was $10^{-3}$ mole/100 g. The results were as follows:

| Nitroso compound | Nitroxyl concentration ($10^{-5}$ mole/100 g) Processing time (mins) | |
|---|---|---|
| | 10 | 15 |
| tB—NO | 3.9 | 4.2 |
| tO—NO | 1.9 | 2.1 |
| B—NO | 4.1 | 4.1 |
| PMB—NO | 2.5 | 2.4 |
| TMB—NO | 2.3 | 2.1 |

EXAMPLE 2

The following N-nitroso compounds were used

| N—nitroso Compounds | Code | Mp (°C.) |
|---|---|---|
| [structure: bis-piperidinyl sebacate bis-nitroso] | PS-NO | 108-9 |
| [structure: piperazine bis-nitroso] O=N—N⟨⟩N—N=O | P-NO | 154 |
| [structure: dicyclohexyl N-nitroso] | DC-NO | — |

The PS-NO was prepared as follows:

9.6 g (0.02 mole) of 2,2,6,6-tetramethyl-4-piperidinyl sebacate (Tinuvin 770) was dissolved in 100 ml alcohol and cooled at 5° C. 3 ml conc. HCl was added slowly with stirring followed by the addition of sodium nitrite solution (1.6 g in 5 ml water). The temperature was maintained at 5° C. A cream crystalline product precipitated after removal of some of the alcohol and was recrystallized from methanol to give a product with the correct elemental analysis (Mp 108°-109° C.).

U.V. Stabilization

The effect of processing time on the U.V. stabilizing effectiveness of the N-nitroso compounds was tested as in Example 1. The polymer composition was made by mixing $10^{-3}$ mole of N-nitroso compound per 100 g polypropylene using a closed mixer at 180° C. The results obtained were as follows:

| Antioxidant | Embrittlement time (hrs) Processing time (min) | | | |
|---|---|---|---|---|
| | 7.5 | 10 | 15 | 20 |
| Tinuvin 770 (PS—H) | — | 760 | — | — |
| PS—NO | 1100 | 1580 | 1120 | 880 |
| P—NO | 370 | 570 | 440 | 330 |
| DC—NO | 200 | 230 | 190 | 140 |
| No additive | 85 | 85 | 75 | — |

The effectiveness of different concentrations ($10^{-4}$ g/100 g – $10^{-3}$ g/100 g) of the N-nitroso compound on the U.V. stability of polypropylene was tested. All samples were processed for 10 minutes at 180° C. The results were as follows:

| Antioxidant | Embrittlement time (hrs) Concentration ($\times 10^{-4}$ g/100 g) | | |
|---|---|---|---|
| | 1 | 5 | 10 |
| PS—NO | 440 | 1340 | 1580 |
| P—NO | 155 | 300 | 570 |
| DC—NO | 135 | 190 | 230 |

Melt Stabilization

The melt stabilization of polypropylene obtained with N-nitroso compounds according to the invention was measured and compared with that obtained using Tinuvin 770.

Whereas in polypropylene containing $10^{-3}$ mole/100 g of Tinuvin 770 the melt flow index doubled within 10 minutes of processing at 180° C. in a closed Torque Rheometer, the corresponding bis-nitroso compound (PS-NO) had an induction period of 20 minutes before any change occurred. P-NO and DC-NO both had induction periods of 10 minutes under the same conditions.

Nitroxyl Concentration

The concentration of nitroxyl radicals ($10^{-5}$ mole/100 g) in polypropylene after processing with the N-nitroso compounds in a closed mixer (180° C./10 minutes) was measured. The initial concentration of N-nitroso compound was $10^{-3}$ mole/100 g. The results were as follows:

| N—nitroso Compound | Nitroxyl concentration ($10^{-5}$ mole/100 g) |
|---|---|
| PS—NO | 5.9 |
| P—NO | 4.7 |
| DC—NO | 3.6 |

EXAMPLE 3

There were used the following nitrone compounds:

| Nitrone | Code | Mp (°C.) |
|---|---|---|
| 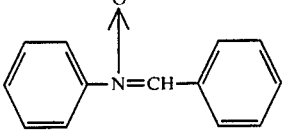 | DPN | 110 |
| 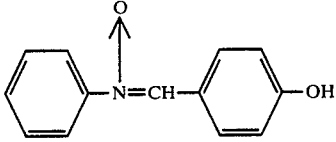 | HDPN | 211 |
| 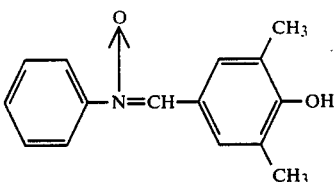 | MHDPN | 112 |
| 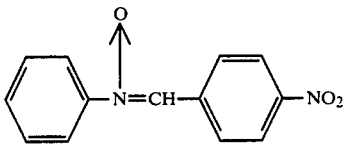 | NDPN | 176 |
| 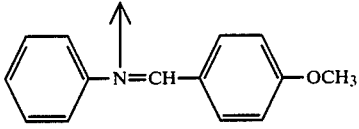 | MDPN | 117 |
| 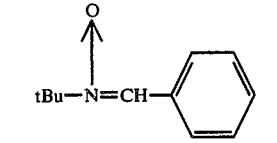 | PBN | 74 |
| 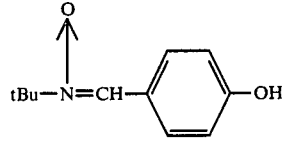 | HPBN | 228 |
| 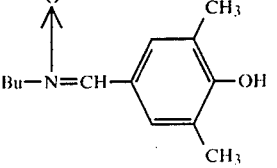 | MHPBN | 178 |

(tBu represents tertiary butyl).

U.V. Stabilization

The effect of processing on U.V. stability of polypropylene mixed with these nitrone compounds was tested as in Example 1. The nitrones were used at a concentration of $10^{-3}$ moles/100 g and the processing was carried out in a closed mixer at 180° C. The results obtained were as follows:

| | Embrittlement time (hrs) Processing time (mins) | | | |
|---|---|---|---|---|
| Nitrone | 7.5 | 10 | 15 | 20 |
| Control (no additive) | 85 | 85 | 75 | — |
| DPN | 200 | 245 | 290 | 185 |
| HDPN | 240 | 210 | 210 | 200 |
| MHDPN | 140 | 140 | 140 | 120 |
| NDPN | 230 | 210 | 210 | 210 |
| MDPN | 130 | 150 | 160 | 140 |
| PBN | 90 | 90 | 90 | 90 |
| HPBN | 120 | 140 | 160 | 200 |
| MHPBN | 130 | 130 | 130 | 130 |

Melt Stabilization

The melt stabilization of polypropylene obtained with nitrone compounds according to the invention was measured and compared with that of polypropylene without melt stabilizer.

Unlike the melt flow index of polypropylene containing no additive, which doubled on processing at 180° C. in a closed Torque Rheometer, with the nitrones there was an induction period before any change occurred under the same conditions at $10^{-3}$ mole/100 g. The length of the induction period is listed for typical nitrones below:

| Nitrone Compound | Induction period (mins) |
|---|---|
| DPN | 15 |
| HDPN | >20 |
| MHDPN | >20 |
| NDPN | 15 |
| MDPN | 15 |

Thermal Antioxidant Activity

In addition there was tested the effect of processing conditions on the thermal antioxidant activity of the nitrones in an air oven at 140° C. The concentration of the nitrones was $10^{-3}$ moles/100 g. The results obtained were as follows:

| Nitrone | Embrittlement time (hrs) Processing time (mins) | | | |
| --- | --- | --- | --- | --- |
| | 7.5 | 10 | 15 | 20 |
| Control (no additive) | — | 0.5 | — | — |
| DPN | 1.5 | 1.5 | 1.5 | 1.5 |
| HDPN | 7.0 | 10.0 | 8.5 | 6.0 |
| MHDPN | 18.5 | 14.0 | 11.0 | 9.0 |
| PBN | 1.0 | 1.0 | 1.0 | 1.0 |
| HPBN | 3.0 | 4.0 | 2.5 | 2.0 |
| MHPBN | 9.0 | 7.5 | 4.5 | 2.5 |

EXAMPLE 4

The synergistic effects of stabilizers used according to the present invention with conventional U.V. stabilizers were tested by measurement of the U.V. stabilization as in Example 1 of polypropylene compositions prepared using such mixtures of stabilizers. By way of control embrittlement times of polypropylene containing the stabilizers alone were also obtained. The results were as follows:

| Additive | Concentration ($\times 10^{-4}$ mole/100 g) | Embrittlement time (hours) |
| --- | --- | --- |
| Control (no additive) | — | 85 |
| tB—NO | 5 | 410 |
| Cyasorb UV 531 | 5 | 340 |
| Tinuvin 770 | 5 | 700 |
| B—NO | 5 | 210 |
| Tinuvin 770 + tB—NO | 5 + 5 | >2000 |
| Tinuvin 770 + B—NO | 5 + 5 | 2000 |
| Cyasorb UV 531 + tB—NO | 5 + 5 | >2000 |

We claim:

1. A process for preparing a stabilized thermoplastic polymer composition which comprises:
mixing polyethylene, polypropylene, an ethylene-propylene copolymer or polyvinyl chloride with a C-nitroso-containing compound, which function as a stabilizer, under polymer processing conditions such that nitroxyl radicals are formed.

2. The process according to claim 1, wherein said stabilizer is a C-nitroso-containing compound of formula I: wherein R represents an unsubstituted or substituted alkyl group, an unsubstituted or substituted phenyl or naphthyl group, or a heterocyclic aromatic or reduced heterocyclic group.

3. The process according to claim 2, wherein said stabilizer is a tertiary alkyl nitroso compound.

4. The process according to claim 2, wherein, in formula I, R represents a tertiary butyl or octyl group, $C(CH_2OR')_3$ or $R''_x C(CH_2OR')_{3-x}$, wherein x is 1, 2 or 3, R' represents a hydrogen atom or an unsubstituted or substituted alkyl or acyl group, wherein each R' substituent may be the same or different, and R" represents an unsubstituted or alkyl-, chloro-, hydroxy-, carboxy-, cyano-, nitro- or dimethylamino- substituted phenyl or naphthyl group.

5. The process according to claim 1, wherein said stabilizer is present in an amount of up to 1% by weight.

6. The process according to claim 1, wherein an additional stabilizer is also mixed into the thermoplastic polymer.

7. The process according to claim 6 wherein the additional stabilizer is a thermal antioxidant and/or U.V. stabilizer.

8. The process according to claim 1, wherein a master-batch composition is initially prepared by mixing a thermoplastic polymer with a nitrogen-containing stabilizer under polymer process conditions such that nitroxyl radicals are formed, and then mixing the master-batch composition with additional thermoplastic polymer.

9. A composition prepared by the process claimed in claim 1.

* * * * *

UNITED STATES PATENT AND TRADEMARK OFFICE
CERTIFICATE OF CORRECTION

PATENT NO. : 4,672,088

DATED : June 9, 1987

INVENTOR(S) : Scott and Chakraborty

It is certified that error appears in the above-identified patent and that said Letters Patent is hereby corrected as shown below:

On the title page
-- The priority data was omitted from the Letters Patent. It should read:

Sept. 30, 1983 [GB] United Kingdom............
............8326238--

Signed and Sealed this

Tenth Day of November, 1987

Attest:

DONALD J. QUIGG

*Attesting Officer*  *Commissioner of Patents and Trademarks*